(12) United States Patent
Chomel et al.

(10) Patent No.: US 12,090,704 B2
(45) Date of Patent: Sep. 17, 2024

(54) METHOD FOR COOLING HEATED MOLDS FROM A MACHINE FOR MOLDING CONTAINERS

(71) Applicant: SIDEL PARTICIPATIONS, Octeville-sur-mer (FR)

(72) Inventors: Nicolas Chomel, Octeville-sur-mer (FR); Damien Fournier, Octeville-sur-mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 596 days.

(21) Appl. No.: 15/568,687

(22) PCT Filed: Apr. 21, 2016

(86) PCT No.: PCT/FR2016/050932
§ 371 (c)(1),
(2) Date: Oct. 23, 2017

(87) PCT Pub. No.: WO2016/170277
PCT Pub. Date: Oct. 27, 2016

(65) Prior Publication Data
US 2018/0297264 A1  Oct. 18, 2018

(30) Foreign Application Priority Data
Apr. 23, 2015 (FR) ..................... 1553632

(51) Int. Cl.
*B29C 49/66* (2006.01)
*B29C 49/12* (2006.01)
(Continued)

(52) U.S. Cl.
CPC .............. *B29C 49/66* (2013.01); *B29C 49/12* (2013.01); *B29C 49/36* (2013.01);
(Continued)

(58) Field of Classification Search
None
See application file for complete search history.

(56) References Cited

U.S. PATENT DOCUMENTS

| 4,496,517 A | 1/1985 | Kinoshita et al. |
| 5,968,560 A | 10/1999 | Briere et al. |

(Continued)

FOREIGN PATENT DOCUMENTS

| EP | 0 821 641 | 2/1998 |
| EP | 1 927 461 | 6/2008 |

(Continued)

OTHER PUBLICATIONS

Machine English translation of FR2659265, Retrieved Jan. 24, 2020 (Year: 1990).*

(Continued)

*Primary Examiner* — Jacob T Minskey
*Assistant Examiner* — Adrianna N Konves

(57) ABSTRACT

Disclosed is a method for cooling heated molds from a machine for molding containers from thermoplastic material by stretch-blow molding hot preforms using at least one pressurized fluid. The cooling method includes, in order to cool the molds, at least one cooling step that involves selectively feeding at least one cooling fluid into the molding cavity of at least some of the molding units that, after the carousel has been stopped in order to immobilize the molding units at least during the cooling step, are located in a predetermined cooling region in which the molding units are in a closed position.

20 Claims, 2 Drawing Sheets

(51) Int. Cl.
  B29C 49/36 (2006.01)
  B29C 49/48 (2006.01)
  B29C 49/78 (2006.01)
  B29C 49/06 (2006.01)
  B29C 49/70 (2006.01)
  B29K 101/12 (2006.01)
  B29L 31/00 (2006.01)

(52) U.S. Cl.
  CPC ........ B29C 49/4823 (2013.01); B29C 49/786 (2013.01); *B29C 49/06* (2013.01); *B29C 49/1212* (2022.05); *B29C 2049/4838* (2013.01); *B29C 2049/702* (2013.01); *B29C 49/78* (2013.01); *B29K 2101/12* (2013.01); *B29L 2031/7158* (2013.01)

(56) References Cited

U.S. PATENT DOCUMENTS

| | | | |
|---|---|---|---|
| 6,464,486 | B1 | 10/2002 | Barray et al. |
| 6,562,281 | B1 | 5/2003 | Marchau |
| 7,249,944 | B2 | 7/2007 | Arakelyan et al. |
| 7,824,166 | B2 | 11/2010 | Mie et al. |
| 8,052,904 | B2 | 11/2011 | Derrien et al. |
| 8,778,241 | B2 | 7/2014 | Hirdina |
| 9,115,832 | B2 | 8/2015 | Cirette et al. |
| 9,296,147 | B2 | 3/2016 | Le Pechour et al. |
| 9,409,342 | B2 | 8/2016 | Le Pechour et al. |
| 2003/0098526 | A1* | 5/2003 | Krishnakumar ........ B29C 49/20 264/516 |
| 2009/0160102 | A1 | 6/2009 | Schuster et al. |
| 2010/0327474 | A1 | 12/2010 | Hirdina |
| 2014/0145377 | A1 | 5/2014 | Knapp |
| 2014/0284916 | A1* | 9/2014 | Cirette ................ B29C 33/04 285/82 |

FOREIGN PATENT DOCUMENTS

| | | |
|---|---|---|
| EP | 2 269 803 A2 | 1/2011 |
| EP | 2 703 146 | 3/2014 |
| FR | 2 646 802 | 11/1990 |
| FR | 2 659 265 | 9/1991 |
| FR | 2 764 544 | 12/1998 |
| FR | 2 843 714 | 2/2004 |
| FR | 2 949 707 | 3/2011 |
| FR | 2 983 766 | 6/2013 |
| WO | 96/33059 A1 | 10/1996 |
| WO | 99/03667 | 1/1999 |
| WO | 2009/044067 | 4/2009 |
| WO | 2013/083523 A1 | 6/2013 |
| WO | 2013/093335 A1 | 6/2013 |

OTHER PUBLICATIONS

International Search Report, dated Jul. 8, 2016, from corresponding PCT application No. PCT/FR2016/050932.

* cited by examiner

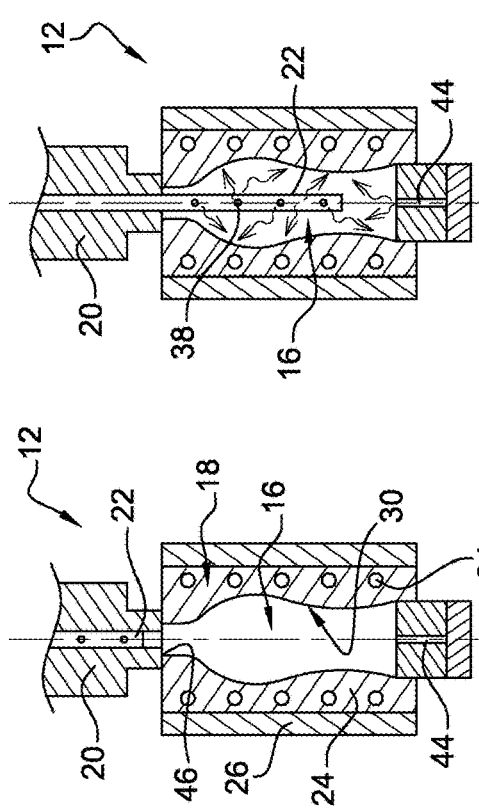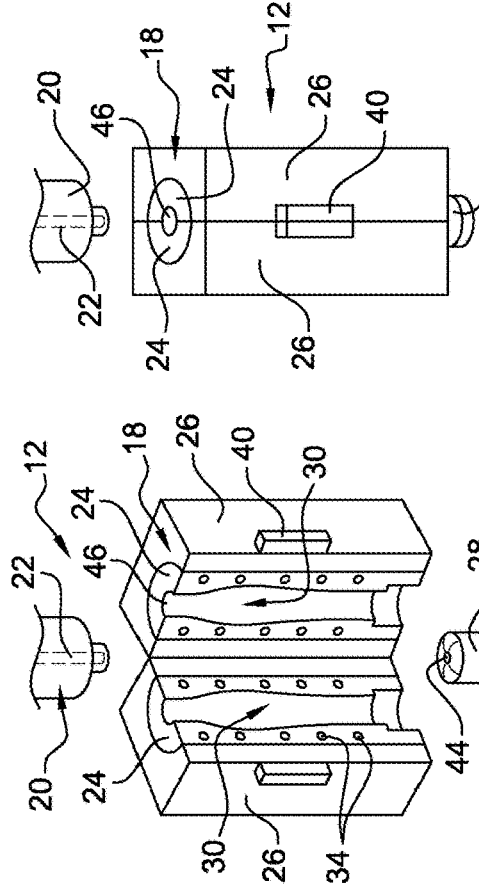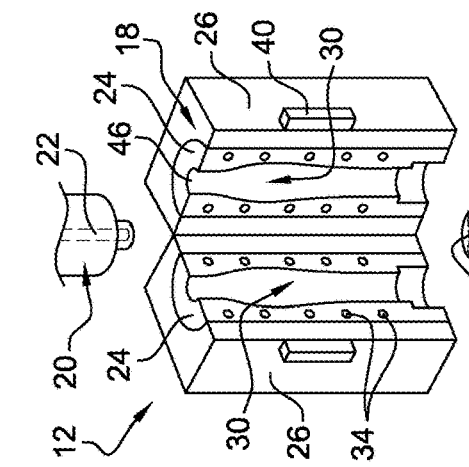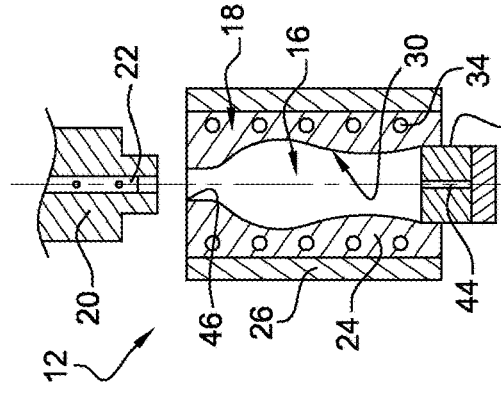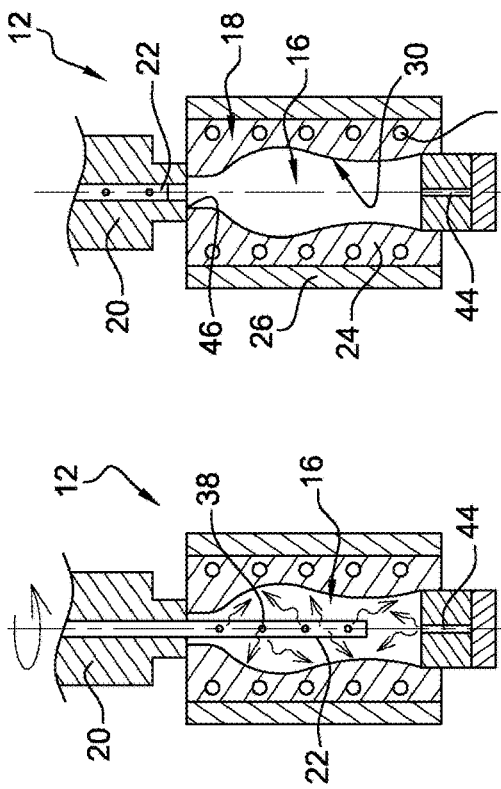

METHOD FOR COOLING HEATED MOLDS FROM A MACHINE FOR MOLDING CONTAINERS

This invention relates to a method for cooling heated molds from a machine for molding containers.

This invention relates more particularly to a method for cooling heated molds from a machine for molding containers from thermoplastic material by stretch blow molding hot preforms by means of at least one pressurized fluid, with said rotary-type machine comprising at least molding units, each comprising at least one mold and that are arranged on the periphery of a carousel that is able to be driven in rotation around an axis of rotation of the machine, with each molding unit comprising at least blow-molding means integrating a stretching rod, heating means associated with said at least one mold of the unit for heating it, with said mold comprising at least two half-molds that each comprise an inner molding face and that are respectively mounted on movable supports around an axis between at least one open position and one closed position of the unit, in which said inner faces of said at least two attached half-molds delimit together at least a portion of a molding cavity of the container.

The selection of the device and the method for manufacturing containers also depends on the expected use of the containers. By way of non-limiting examples, the use that may or may not be made of a stretching device in combination with the blow-molding means or else the execution of a cooling of the interior of the container by a fluid flushing carried out with a stretching rod, or the presence of a mold bottom that just completes the cavity are characteristics of the device or the manufacturing method that are based on the applications and the use of the containers.

The invention thus more particularly relates to a manufacturing method using so-called "heated" molds, also called "HR"-type—English acronym for "heat resistant" ("HR" can also refer by extension to the containers obtained by such a manufacturing method).

When the containers made of thermoplastic material that are manufactured by the molding machine are to be filled with a hot liquid, such as tea or a pasteurized fruit juice, there is a risk that a container molded at an ambient temperature will retract and deform.

To avoid this retraction phenomenon during a hot filling ("hot fill" in English), an attempt is made to increase the resistance of the material to deformations induced by the rise in temperature during filling.

A known technique consists in increasing in a thermal manner the crystallinity of the material by heating the mold to a predetermined temperature that, higher than 100° C., is—according to the applications—generally between 120° C. and 160° C., to impart a heat-resistant structure to the thermoplastic material constituting the container.

During the manufacturing cycle of the container by the machine, the container is held at the end of the blow molding by contact with the heated inner face of said at least two half-molds that form the mold to bring about an increase in the crystallinity of the material; this technique is also called thermofixation (or "heat set" in English).

For this particular application, the molding units of the machine each comprise heating means that are associated with the mold to heat it to the desired temperature, and different types of heating means of the mold are known from the prior art.

According to a first design, it is known to heat the mold by means of a fluid circuit that is made in the thickness of the mold and in which a hot coolant is circulated.

According to a second design, it is known to arrange electric heating resistors in the thickness of the mold so as to heat the mold electrically.

Reference will be made by way of non-limiting example to the document WO-2013/093335 of the applicant for more ample details on a mold that is equipped with such electric-type heating means.

The manufacturing of containers by the molding machine must be occasionally interrupted, however, to carry out maintenance operations on the machine; more particularly, certain operations on the heated mold require that an operator be able to work on the mold in complete safety and occasionally be able to manipulate it.

A maintenance operation by at least one operator may be required to carry out, for example, an operation for cleaning the inner face of the molds or else for initiating the changing of the molds, in particular when it is desired to change the size of the container to be manufactured.

The operator cannot manipulate such a heated mold in complete safety immediately after the manufacturing is stopped because the mold, generally at a temperature of higher than 100° C., is then too hot.

However, it is not economically profitable to wait passively for the mold to cool, by natural convection, by immobilizing during this time the entire production line.

To solve this problem, it is known to use means for cooling the mold to actively cool such heated molds (also occasionally called "HR type") and thus to reduce the necessary down time before being able to initiate a human intervention on the molds of the machine in complete safety.

When the mold is heated by a hot coolant circuit, it is proposed to replace this hot coolant temporarily by cold coolant in order to cool it.

The document EP-2,703,146 in the name of the applicant describes an example of cooling a heated mold by such a cold coolant that is circulated directly against the outer face of the parts of the mold.

If such a method makes it possible to cool the mold, it is not, however, without exhibiting certain drawbacks.

Actually, the manufacturing of a mold that is equipped with a coolant circuit dedicated to cooling proves expensive and complicated to produce, in particular in the presence of heating resistors in the thickness of the mold.

The document US-2010/0327474 in the name of Krones AG describes another example of the method for cooling heated molds of a machine for the purpose of carrying out a changing of the molds.

According to the teachings of this document, a cooling fluid is simultaneously introduced inside all of the empty molds (without preforms) of the container molding units of the machine, with said cooling fluid being brought into contact with the inner face of the mold by means of a stretching rod.

However, such a cooling method in reality provides results that are not—or not very—satisfactory. This cooling method has in particular the drawback of carrying out a cooling simultaneously in all of the molds.

Actually, the simultaneous cooling of all of the molds ultimately proves not very effective because of the quantity of fluid introduced into each of the molds that is too small.

For making improvements, one skilled in the art would initiate important modifications of all of the means that are present and used during the manufacturing of containers with the molds of the machine, which is not, however, desirable because of the economic consequences that this would involve.

In addition, by simultaneously cooling all of the molds of the machine, the cooling fluid is introduced by each of the stretching rods independently of the open or closed position occupied by the molding units.

The cooling that is achieved is thus not very effective for the open units whose parts of the mold are in particular further away from the stretching rod and therefore from the cooling fluid brought by the rod. A portion of the cooling fluid is consequently wasted with respect to the desired cooling.

The object of this invention is to solve at least a portion of the drawbacks of the prior art and to propose a cooling method that makes it possible in particular to achieve a cooling that is effective and fast in a reliable, simple and inexpensive manner.

For this purpose, this invention proposes a method for cooling heated molds of the type described above, characterized in that said cooling method comprises, to cool said molds, at least one cooling step that consists in selectively introducing at least one cooling fluid inside the molding cavity of at least some of the molding units that, after the carousel is stopped to immobilize them at least during said cooling step, are in a predetermined cooling zone in which said molding units are in the closed position.

Advantageously, the cooling fluid is introduced during each cooling step in only some of the molds and not in all of the molds, which makes it possible to optimize the effectiveness of the cooling achieved for a given consumption of cooling fluid.

Advantageously, the cooling method makes it possible to achieve an effective cooling without requiring any modification of the molding machine.

The cooled molds are advantageously stationary during the cooling step whose duration is then unrestricted since the molding units are present in the cooling zone and remain so in the closed position.

By comparison, when the carousel is driven in rotation as in the above-cited document US-2010/0327474, the units are alternately in the closed position and primarily open based on the angular sector of the machine in which a given unit is found. The fact that the molding units are stationary when the molds are cooled according to the method is particularly advantageous in terms of energy savings.

Energy is saved in particular because of the absence of continuous driving of the carousel during cooling.

In relation to the operation of the machine in the container manufacturing mode, certain means may not be in operation or may have lower energy consumption during operation.

By way of non-limiting examples, when the carousel of the machine is driven in rotation continuously during cooling, certain means such as means for ejecting containers or else for braking then operate automatically under conditions that are identical to those of the manufacturing mode, which is no longer the case with the method of the invention.

The execution of the cooling method is done by advantageously using all of the existing means, without modifications, including the source of pressurized cooling fluid such as at least the air up to the stretching rod for its introduction inside the molding cavity.

Owing to the selective introduction of the cooling fluid, the cooling fluid can be introduced into each of the molds that are selected with a flow rate that is greater than that of the prior art by using the same pressure source.

The quantity of cooling fluid brought into contact with the mold is larger, increasing the heat exchange that takes place between said fluid and the mold.

The introduction of the cooling fluid only into a mold of a molding unit occupying its closed position, and preferably locked in the closed position, takes a significant part in increasing the effectiveness of the cooling.

Actually, the cooling fluid cannot spill out of the mold in the closed position; the fluid therefore circulates in a confined space formed by the molding cavity, then performing a heat exchange upon contact with the mold to be cooled before being evacuated through the opening.

Advantageously, the leaks of the cooling fluid outside of the mold of the molding unit in the closed position can also be reduced by locking the molding unit in the closed position.

Advantageously, the compensation means equipping a molding unit are also able to be used during the cooling step for reducing the leaks of fluid outside of the molding unit.

The use of locking means and/or compensation means by limiting the leaks also plays a part in limiting the noise emission, in particular whistling, which can take place based on the pressure of the cooling fluid during its introduction into the molding cavity.

Advantageously, the cooling fluid that is introduced in a continuous manner, for a predetermined duration, makes it possible to achieve a mixing effect inside the molding cavity, an effect that is particularly favorable to heat exchanges. The cooling fluid propagates inside the molding cavity of the mold in the form of a turbulent flow.

The cooling fluid that escapes through the opening of the closed mold is renewed, replaced by another cooling fluid that continues to be introduced by the stretching rod, thus creating a permanent circulation in the molding cavity.

Advantageously, the intermittent introduction of the cooling fluid following a sequence comprising an interruption between two successive introductions makes it possible to use an optimal quantity of cooling fluid for a given heat transfer, by preventing too fast an evacuation of the fluid out of the molding cavity.

The total time that is necessary for cooling all of the molds of the molding units of a machine is less when the cooling step of the cooling method is carried out in only some of the molds and then in other molds, even by repeating it more than once in each of the molds or groups of molds.

However, one skilled in the art would inevitably have thought the opposite, and this is why the simultaneous cooling of all of the molds until then constituted the technical solution of the prior art.

According to other characteristics of the invention:
 The introduction of the cooling fluid depending on the cooling step is carried out simultaneously on all of the molding units that are in said cooling zone;
 The introduction of the cooling fluid depending on the cooling step is carried out simultaneously on only some of the molding units that are in said cooling zone;
 The cooling zone corresponds to an angular sector that is centered on the axis of rotation of the machine and that has an angle ($\beta_1$ or $\beta_2$) whose value is less than or equal to ($360°-\alpha$) with an angle ($\alpha$) that corresponds to the angular sector in which said molding units are in the open position;
 The cooling zone corresponds to an angular sector that is centered on the axis of rotation of the machine and that has an angle whose value is less than or equal to 180°;

The introduction of the cooling fluid during the cooling step is carried out in molding units that are locked into the closed position by locking means that comprise each of said molding units of the machine;

Said cooling fluid comprises at least one pressurized gas;

Said at least one pressurized gas of the cooling fluid is air;

Cooling fluid is introduced inside the molding cavity by at least one stretching rod;

The stretching rod is moved axially inside the molding cavity during said cooling step for carrying out an axial flushing of the molding cavity;

The stretching rod is driven selectively in rotation for carrying out a circular flushing of the molding cavity by means of cooling fluid;

Cooling fluid is introduced inside the molding cavity by demolding means of the bottom equipping the molding units of said machine;

Cooling fluid is introduced intermittently during the cooling step according to at least one sequence that comprises at least one introduction of said fluid during a predetermined duration followed by an interval during which said introduction is interrupted;

Said cooling method comprises at least one step for measuring temperature for determining the temperature of the cooled molds, and said cooling step is repeated in said molding units until said temperature of the molds is less than or equal to a predetermined target temperature.

Other characteristics and advantages of the invention will emerge during the reading of the detailed description that will follow for the understanding of which reference will be made to the accompanying drawings, among which:

FIGS. 3a to 3h are diagrammatic views that show a molding unit of the machine in perspective or in cutaway and that illustrate the primary steps of a cooling cycle of the mold of one of the molding units.

In the detailed description that follows, the "axial" direction conventionally corresponds to that of the axis of rotation of the machine, and the "radial" direction is orthogonal to the axial direction.

In a general manner, the invention relates to the field of the manufacturing of containers made of thermoplastic material from preforms, such as bottles manufactured from PET (polyethylene terephthalate).

Such hollow containers are in particular—but not exclusively—used in the food-processing field for the packaging of liquids such as water, milk, juices, etc.

Their manufacturing is carried out in a container manufacturing installation also comprising a machine 10 for molding containers of thermoplastic material from hot preforms, more generally blanks whose preforms constitute a particular embodiment.

Figure 1:
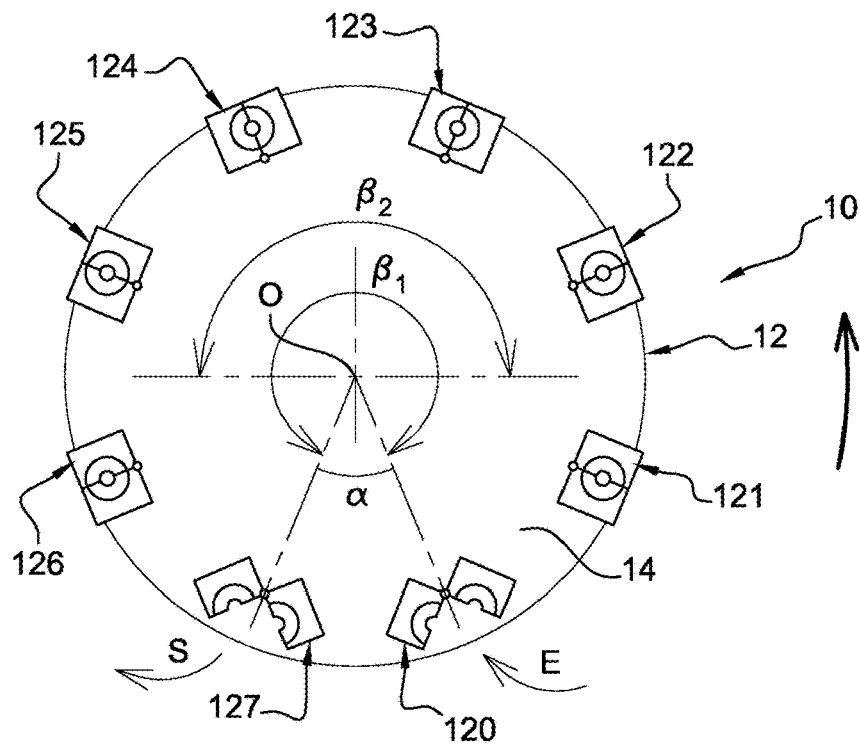
FIG. 1 is a top view that diagrammatically shows an embodiment of a rotary-type molding machine and that illustrates the molding units (without the blow-molding and stretching means) distributed circumferentially on the carousel and that, based on their relative position in relation to the entrance or the exit of the machine, are in the open position or in the closed position.

An embodiment of such a molding machine 10 (also called "blower") was shown more particularly in FIG. 1, in a diagrammatic manner and in a top view.

The rotary-type molding machine 10 comprises in particular molding units 12 that are arranged radially on the periphery of a carousel 14 that is driven in rotation around an axis O of rotation of the machine.

The molding machine 10 comprises means for driving the carousel 14, such as a motor, which can drive it in rotation at a predetermined speed of rotation.

The molding units 12 are advantageously distributed circumferentially in a uniform manner around the axis O of rotation.

In the embodiment, the molding machine 10 comprises eight molding units 12, consecutively referenced from 120, 121, 122, . . . up to 127 to be able to distinguish them based on their relative position around the axis O of rotation. Each of said units 12 moves with the carousel 14 to execute a turn, i.e., 360°, before returning to the same position.

The molding machine 10 comprises a first group of molding units 12, called even, formed respectively by four units 120, 122, 124 and 126, and a second group of molding units 12, called odd, formed respectively by four other units 121, 123, 125 and 127.

The molding machine 10 operates at least according to a first operating mode, so-called manufacturing mode, in which the machine is supplied with preforms for manufacturing containers.

The molding machine 10 is supplied at the entrance E with a continuous flow of hot preforms and delivers at the exit S as many containers, such as bottles.

A cycle for manufacturing a container within the machine corresponds to a turn that is executed by each of the molding units 12 from the entrance E where a hot preform is introduced into one of the units 12 in the open position to the exit S where the unit, having now on said turn occupied the closed position with locking to form the container, is again opened in order to extract the container therefrom.

According to a known manufacturing method, the preforms—obtained in advance by injection—should then be reheated in a furnace (not shown), associated with the molding machine 10, up to a glass transition temperature so as to make the thermoplastic material thereof sufficiently malleable.

Reference will be made by way of non-limiting example to FIG. 5 of the document WO-99/03667 in the name of the applicant for a representation of an installation for manufacturing containers operating according to such a method and comprising in particular a furnace that is associated with a molding machine (or blower).

Each hot preform is transferred from the exit of the furnace by transfer means (not shown), such as at least one wheel, to be inserted into a molding cavity 16 of a mold 18 of one of said molding units 12 of the machine 10.

Each preform is then shaped by blow-molding means 20, and, according to the applications, an associated stretching rod 22.

As a variant and according to another manufacturing method, the preforms are obtained by extrusion and directly transformed into containers in the molding machine 10; such a manufacturing method is also called "extrusion-blow-molding."

The mold 18 of a molding unit 12 is formed by at least two half-molds, respectively referenced 24, which are respectively mounted in a removable manner on supports 26.

At least one of the supports 26 of the mold 18 is mounted to move in relation to the other around an axis of rotation A, respectively between at least one open position and one closed position of the molding unit 12.

A molding unit 12 comprising mold supports 26 that are respectively mounted to move in rotation in relation to one another is also called "portfolio" because of the kinematics of rotation between the open and closed positions.

Reference will be made by way of non-limiting example to the document FR-2,843,714 for more ample details on the embodiment of a mechanical control device for opening and closing such a portfolio-type molding unit (or "book-like opening" in English).

Preferably, and in a known way, the mold 18 is made in three parts and comprises a mold bottom 28, which is complementary to the two half-molds 24 and comprises the impression of the bottom of the container. In this case, the half-molds 24 determine the impression of the wall of the body of the container.

The mold bottom 28 is mounted on a support, separate from the supports 26, which moves axially between a lower position and an upper position in which the supports 26 are closed around said mold bottom 28.

The half-molds 24 of the mold 18 are attached in a removable manner on the two supports 26 by attachment means (not shown).

Reference will be made by way of non-limiting example of the structure of a molding unit and attachment means of the mold in the document FR-2,949,707 or else EP-0,821,641, respectively in the name of the applicant.

Each half-mold 24 comprises an inner face 30 of molding in which an impression corresponding to a portion of the container to be manufactured is recessed.

In the closed position of the unit 12, said inner faces 30 of said at least two attached half-molds 24 together delimit said molding cavity 16 of the container, completed, if necessary, by the upper face of the container mold bottom 28.

In the embodiment, each molding unit 12 of the machine 10 comprises at least associated blow-molding means 20.

Such blow-molding means 20 are well known and are produced, for example, in the form of a nozzle that is arranged above the unit 12 and that is mounted to move axially to cover the molding unit 12.

During the manufacturing of a container, the blow-molding means 20 will work with the upper face of the molding unit 12 in the closed position to introduce at least one blow-molding fluid inside the hot preform through the opening that is delimited by its neck that projects outside of the mold.

Reference will be made by way of non-limiting examples to the document FR-2,764,544 or to the document EP-1,927,461 for more ample details on the production of such blow-molding means.

The manufacturing of a container is carried out by blow molding a hot preform in a mold 18 of a molding unit 12 of the machine 10 by means of at least one pressurized fluid, generally air.

In the embodiment, the manufacturing of containers is carried out by stretch blow molding. The blow-molding means 20 advantageously integrate at least one stretching rod 22.

The stretching rod 22 is driven axially in movement by associated drive means 32.

Preferably, the drive means 32 of the stretching rod 22 comprise at least one linear motor. As a variant, they consist of mechanical-type means.

By comparison with drive means of the mechanical type, for example a cam-and-roller drive, a linear motor offers total freedom of control of the axial movement of the stretching rod 22.

Still by comparison with drive means of the cam-and-roller type, the axial sliding of the stretching rod 22 is advantageously independent of the relative movement of the molding unit 12 when the carousel 14 is driven in rotation.

The stretching rod 22 is mounted to slide axially to be introduced selectively inside the preform through the opening that is delimited radially by its neck, an annular space being left free between the neck and the rod to make possible the passage of the blow-molding fluid.

The stretching rod 22 is mounted to move axially between at least a first upper position and a second lower position.

In the first position, the rod 22 extends outside of the mold 18, and in the second position, the rod 22 is moved downward to stretch the preform axially inside the mold, during the blow molding, by resting against the bottom of said preform.

The molding unit 12 comprises heating means 34 associated with the mold 18 of the unit for heating it.

Figure 2:
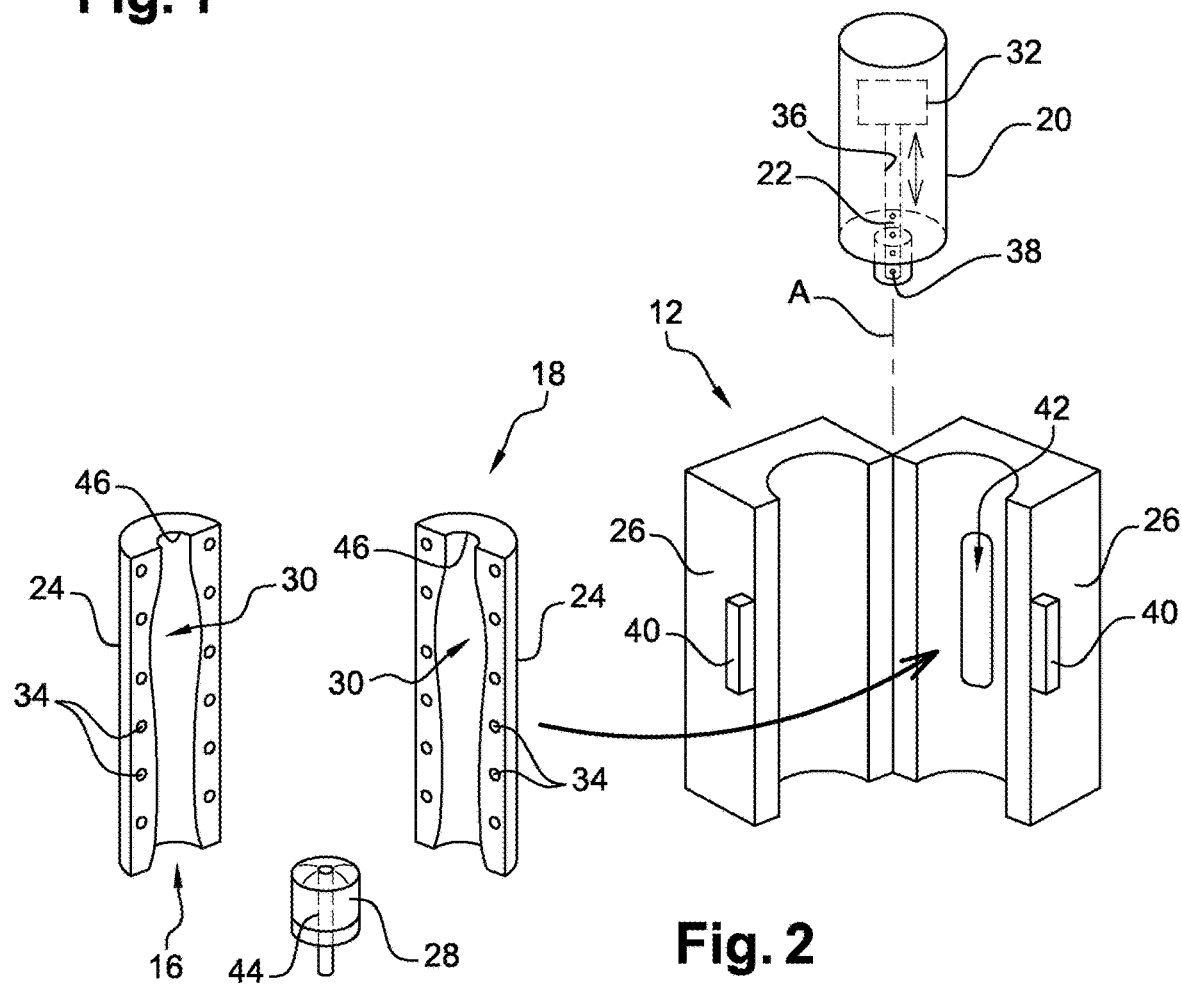
FIG. 2 is a perspective view that shows one of the molding units of the machine according to the embodiment of FIG. 1 and that illustrates it in detail with, in addition to the unit in the open position, an exploded view of a mold that is made in three parts, comprising two half-molds and a mold bottom.

The heating means 34 are, for example, formed by electrical resistors shown very diagrammatically in FIG. 2. In a variant, the heating means 34 are formed by pipes through which a hot fluid passes.

It is also known for certain applications to carry out, before its extraction, a cooling of the container inside the mold.

To carry out such a cooling of the container, generally the stretching rod 22 that, in this case, is hollow and then ensures a dual function, namely a stretching function, on the one hand, and another function of cooling the container, on the other hand, is used.

The hollow stretching rod 22 comprises, for example, a central channel 36 that extends axially and communicates with a number of openings 38 through which a gas, in particular air, is injected inside the manufactured container so as to cool it.

Reference will be made by way of non-limiting example to the document WO-2009/044067 for more ample details on the embodiment of such a cooling of the container.

Each molding unit 12 also comprises in a known manner locking means 40 for locking the unit 12 in the closed position.

The locking means 40 are controlled selectively by associated control means, respectively between an unlocked position and a locked position in which the molding unit 12 is kept in the closed position.

Reference will be made by way of non-limiting example to the document FR-2,646,802 for more ample details on such locking means to lock a container molding unit temporarily in the closed position.

Preferably, each molding unit 12 comprises compensation means 42, such as a compensation chamber arranged in one of the supports 26.

Reference will be made by way of non-limiting example to the document FR-2,659,265 for more ample details on the function and the design of such a compensation chamber during the molding of the container.

Advantageously, the molding unit 12 comprises means 44 for demolding the bottom. The means 44 for demolding the bottom are arranged in the part of the mold 18 that corresponds to the impression of the bottom of the container, for example in the mold bottom 28 when said mold 18 is made in three parts.

The demolding means 44 are used to facilitate the demolding of the bottom of the manufactured container by separation of the latter from the mold bottom. For this purpose, they generally comprise means for injection of a pressurized fluid, such as air.

The compressed air is introduced through the mold bottom 28 (or in the absence of such a mold bottom 28 through the bottom of at least one of the half-molds 24) to exert pressure on the bottom of the manufactured container so as to separate it in such a way as to facilitate its extraction from the mold 18.

Reference will be made by way of non-limiting example to the document FR-2,983,766 that describes and shows such means for demolding the bottom designed to facilitate the extraction of the container, in particular when the bottom of the container has a complex petaloid shape.

In the closed position, the mold 18 has an opening 46 that is made in its upper face and that makes possible, in the manufacturing mode, the passage of the hot preform, whose body then extends inside the molding cavity 16 and whose neck projects outside.

As indicated above, the description just given corresponds to a conventional use of a molding machine 10 in the first operating mode, so-called manufacturing mode, in which the machine 10 is supplied with preforms for manufacturing containers by stretch blow molding.

The molding machine 10 also operates according to a second operating mode, a so-called cooling mode, in which the machine 10 ceases in particular to be supplied with preforms.

The molding machine 10 is in particular switched into such a cooling mode to execute the method for cooling molds according to the invention.

The primary steps of the cooling method are shown in FIGS. 3*a* to 3*h* that illustrate the cooling of the mold in one of the molding units 12 of the machine 10.

The cooling method comprises at least one preliminary step in said at least one cooling step, with said preliminary step consisting in ceasing to heat each of the molds 18 in order to cool said molding units 12.

The preliminary step consists in, for example, ceasing to supply the resistors electrically when, according to the embodiment illustrated in FIG. 2, the heating means 34 are formed by electrical resistors, or ceasing to circulate the hot fluid when the means 34 are pipes.

The cooling method comprises, to cool said molds 18, at least one cooling step that consists in introducing selectively at least one cooling fluid inside the molding cavity 16 of at least some of the molding units 12 that, after stopping the carousel 14 to immobilize them at least during said cooling step, are in a predetermined cooling zone in which said molding units 12 are in the closed position.

By comparison with the document US-2010/0327474, the cooling step is not executed in all of the molding units but in only some of them since the molds of the molding units in the open position are not cooled.

In addition, in the prior art, the molding units are moved during cooling because the carousel is driven in rotation; the molding units then alternate open position and closed position.

By comparison with the prior art in which the machine is used in a dynamic manner during cooling, cooling carried out under static conditions makes it possible to produce significant energy savings, especially electricity.

In the invention, the carousel 14 is not driven in rotation around the axis O at least during the cooling step. The molding units 12 are consequently stationary and remain in the closed position during the execution of the cooling step.

The duration of the cooling step is independent of the speed at which the carousel 14 is driven in rotation, which would otherwise determine the length of time during which a molding unit 12 would occupy the closed position.

The cooling step according to the method is carried out simultaneously in all of the units 12 or only in some of the molding units 12 that, occupying said closed position, are in the cooling zone.

Below, two embodiments of the cooling method that illustrate in particular the fact that the cooling zone corresponds to a more or less large angular section will be described.

In a first embodiment of the method for cooling heated molds, the cooling zone is said to be "maximum" and corresponds to an angular sector with angle ($\beta_1$) shown in FIG. 1.

The maximum cooling zone corresponds to an angular sector that is centered on the axis O of rotation of the machine 10 and that has an angle ($\beta_1$) whose value is equal to (360°−$\alpha$) with an angle ($\alpha$) that corresponds to the angular sector in which said molding units 12 are in the open position.

When the cooling step is executed in all of the molding units 12 of the angular sector with angle ($\beta_1$), the cooling is then carried out in those of the molding units 12 that are in the closed position, or else in all of the molding units 12 of the machine 10 except for the molding units 12 in the open position. Owing to which, the cooling step is consequently always carried out in only some of the molding units 12 of the machine 10.

As illustrated in FIG. 1, the maximum cooling zone corresponding to the angular sector with angle ($\beta_1$) respectively comprises the molding units 12 that are referenced 121, 122, 123, 124, 125 and 126 that are in the closed position.

Preferably, the introduction of the cooling fluid depending on the cooling step is in this first example carried out simultaneously on only some of these molding units to optimize the cooling that is achieved, for example carried out in at least every other molding unit 12.

The set of molds 18 of the molding units 12 of a molding machine 10 can be cooled by successively repeating said cooling step in some of the molding units 12 in the closed position and then in others of these molding units 12, always in the closed position.

In the cooling step of the method, cooling fluid is therefore not introduced simultaneously into all of the molding units 12 as in the prior art but in all or at least some of the molding units 12 that are in the closed position.

The introduction of cooling fluid into the molding cavity 16 of the mold 18 of a unit 12 can be carried out one or more times, consecutive or not.

The cooling fluid is introduced intermittently during the cooling step, according to at least one sequence that comprises at least one introduction of fluid for a predetermined duration (d) followed by an interval (t) during which said introduction is interrupted.

By way of non-limiting example, the duration (d) of the introduction and that of the interval (t) are each on the order of 10 seconds.

Advantageously, the sequence is reproduced a number n of times during the cooling step that then comprises an alternating introduction of cooling fluid.

The fact of introducing the cooling fluid intermittently makes it possible for the remaining heat in the mold 18 to be distributed again by conduction in a homogeneous manner, in particular to the inner face 30 delimiting the molding cavity 16, during the interval of time between two successive introductions of fluid.

Advantageously, the fact of cooling only some of the molds 18 of the molding units 12 of the maximum cooling zone and not simultaneously those of all of the units 12 that are found therein makes it possible to achieve a more effective cooling from a given source that delivers said cooling fluid with a given pressure.

Advantageously, the source of cooling fluid is an existing source such as the one that delivers the compressed air that is used in particular for the blow molding in the manufacturing mode of the machine.

The cooling fluid is distributed in a limited number of molding units 12 in the closed position benefitting a flow rate and a larger introduced quantity of fluid, during a cooling step, in each of said cooled molds 18.

Preferably, the introduction of the cooling fluid during the cooling step is carried out simultaneously in at least every other molding unit 12 that is in the maximum cooling zone.

As indicated previously with reference to FIG. 1, the molding units 12 are eight in number in the embodiment.

In the rotary-type molding machine 10, a distinction is conventionally made between, on the one hand, even molding units 12, respectively referenced 120, 122, 124 and 126, and, on the other hand, odd molding units 12, respectively referenced 121, 123, 125 and 127, with an odd molding unit 12 circumferentially following an even molding unit 12 as illustrated in FIG. 1.

Each molding unit 12 of a given parity is therefore placed between two molding units 12 of opposite parity.

Preferably, the cooling step is carried out successively at least once in all of the even molding units 12, and then at least once in all of the odd molding units 12.

The even and odd molding units 12 that are in the angular sector with angle ($\beta_1$) corresponding to the maximum cooling zone in which said molding units 12 are in the closed position are cooled preferably successively (and not simultaneously).

Of course, the cooling step could conversely be carried out in the molds 18 of the odd molding units 12, and then in the molds 18 of the even molding units 12.

According to the first example, the cooling step is executed at least once to cool the molds 18 of the even molding units, or 122, 124 and 126, and then again of the odd molding units 121, 123 and 125.

After which, all of the molds 18 of the molding units 12 that are in the cooling zone were cooled.

If molds 18 of some molding units 12 of the machine 10 have to be (or are still to be) cooled, the carousel 14 is driven in rotation to move the molding units 12.

The carousel 14 is driven, for example, according to a movement corresponding to at least two spaces in such a way as to make the molding units 120 and 127—that were until then in the open position and therefore excluded from the cooling zone—enter into the maximum cooling zone.

Assuming that the carousel 14 moves two spaces in relation to the representation illustrated in FIG. 1, the molding unit 120 will be positioned in the place of the unit 122 and the unit 127 in the place of the unit 121.

The molding units 125 and 126 that were in the cooling zone will exit to be placed, in the open position, in the place of the molding units 127 and 120.

Preferably, in this first example, the cooling step is successively executed in the even molding units 12 or the units 120, 122 and 124, and then in the odd molding units 12 or the units 127, 121 and 123.

The cooling, depending on the cooling step, of one 120 of the molding units 12 immobilized after its introduction into the maximum cooling zone will now be described more particularly below.

As shown in FIG. 1, the molding unit 120 is, for example, positioned at the entrance E of the machine 10 and occupies its open position, and this corresponds to what is illustrated in FIG. 3a.

In the cooling mode, the carousel 14 of the molding machine 10 is driven in rotation at a given speed V2 to bring successively each of said molding units 12 into the cooling zone.

Preferably, the speed V2 of rotation of the carousel 14 in the intervention mode is less than the speed V1 at which the carousel 14 is driven in the container manufacturing mode.

Advantageously, the speed V2 of rotation of the carousel 14 corresponds to slower driving, making it possible to position with precision the molding units 12 in the cooling zone and primarily to immobilize them before initiating cooling.

The molding unit 120 will consequently leave the open position that it was occupying in order to move in the counter-clockwise direction according to the arrow that is shown in FIG. 1, each of the other molding units accordingly being offset angularly, the spacing between the molding units 12 being constant.

It is recalled that the angular sector that is centered on the axis O of rotation in which the molding units 12 are in the open position corresponds to an angle (a).

In the first example, the cooling step is carried out on all or some of the molding units 12 that are located in the maximum cooling zone, or the predetermined angular sector with angle ($\beta_1$) that corresponds, as indicated above, to an angle of (360°–$\alpha$).

By continuing its travel, the molding unit 120 will enter into the maximum cooling zone, automatically passing from the open position to the closed position, with the closing (and the opening) of the units 12 being controlled by a mechanical device of the cam-and-roller type used in the manufacturing mode.

According to the movement of the molding unit 120 in the cooling zone, the molding unit 120 that is in the closed position will be automatically locked or not in said closed position by the locking means 40.

It should be noted that the control of the opening and the closing of the molding units 12 like the locking in the closed position and the unlocking are carried out mechanically in the same manner in the cooling mode as in the production mode.

A unit 12 was shown in FIG. 3b, such that said molding unit 120 occupies its position that is closed and advantageously locked in the closed position.

Preferably, at least a portion of the cooling fluid used during the mold cooling step is formed by at least one pressurized gas.

Advantageously, the cooling fluid consists of compressed air.

The pressurized gas, such as air, will generally undergo an expansion during its introduction inside the molding cavity 16.

The air, however, constitutes only one possible example of cooling fluid. As a variant, the cooling is achieved by means of at least one fluid, in the gaseous state or in the liquid state, or a combination of fluids in one and/or the other of these states.

However, the use of compressed air offers the advantage that at least a portion of the cooling fluid is then formed by the same fluid as the one used for the blow molding during the manufacturing of the containers; in addition, the use of air does not pose any problems of overflow from the mold, which would be the case with liquid.

Consequently, the same source of compressed air can be used for each of the operating modes of the molding machine 10 in order to form the container by blow molding in the manufacturing mode and to cool the mold in the cooling mode.

It will be appreciated that the use of compressed air as a fluid for cooling the molds uses a source that is already present and available on the molding units 12, without in particular requiring a particular modification of the molding machine 10.

The pressure of the air for cooling the molds 18 is determined in particular based on the number of molds cooled simultaneously during a cooling step, the volume of the molding cavity 16, etc.

The pressure of the cooling air is determined in particular based on the maximum pressure that is delivered by the source, the selection of the value of the pressure of the air being essentially a compromise based on the total fluid consumption and achieving the cooling within a given time period. Furthermore, the noise that can be generated during the cooling is also preferably taken into consideration.

The pressure of the cooling air may be different from the maximum pressure reached for the blow molding. Preferably, the cooling air is at a pressure that is lower than that of the blow molding.

The selective introduction of the cooling fluid into only some of the molds 18 makes it possible to introduce a larger quantity of air into each mold.

Actually, by limiting the number of molds cooled simultaneously, a flow of fluid that is more significant in each of the molding cavities 16 of the molds 18 into which said cooling fluid is introduced is obtained from a source at a given pressure.

Advantageously, the cooling fluid is concentrated in a predetermined number of molding units 12 during each cooling step, owing to which the quantity of air introduced into each of the molding cavities 16 is greater.

The cooling fluid forms a turbulent flow inside the molding cavity 16, which turbulent flow takes part in improving the effectiveness of the cooling by increasing the heat exchanges with the entire inner surface of the mold 18 that delimits the molding cavity 16.

As a variant, not shown, at least a portion of the cooling fluid consists of a mixture of air and water, and said mixture advantageously forms a fog.

When the fog initially enters into contact with the hot mold 18 whose temperature is generally higher than 100° C., a change in state from the liquid state to the gaseous state advantageously occurs, which takes part in achieving an effective cooling of the mold.

Cooling fluid is introduced inside the molding cavity 16 of each mold 18 that is cooled at least by the stretching rod 22 of the molding unit 12.

As illustrated in FIG. 3c, the axial descent into the lower position of the blow-molding means 20 that are associated in the example with the molding unit 120, and then or simultaneously that of the stretching rod 22, is consequently controlled.

Cooling fluid can also be introduced inside the molding cavity 16 by the means 44 for demolding the bottom equipping the molding units 12 of said machine 10.

Advantageously, the compressed air that forms all or part of the cooling fluid is introduced into each molding cavity 16 of the mold 18 to be cooled in a combined manner, on the one hand by the stretching rod 22 and on the other hand by the means 44 for demolding the bottom.

Whether the compressed air is introduced via the stretching rod 22 and/or via the means 44 for demolding the bottom, there again, existing means are used for the cooling of the mold 18 in the cooling mode, furthermore used in the manufacturing mode.

As illustrated in FIG. 3d, the stretching rod 22 is moved axially inside the molding cavity 16 during said cooling step to carry out axially a flushing of the molding cavity 16, for example from the top to the bottom and vice versa, according to a predetermined course.

Preferably and as illustrated in FIG. 3e, the stretching rod 22 is driven selectively in rotation to carry out a circular flushing of each molding cavity 16 of the molds 18 that are cooled by means of cooling fluid.

The stretching rod 22 is driven, for example, in a continuous manner on itself to carry out a flushing over 360° or, as a variant, sequentially.

The driving in rotation of the stretching rod 22 is advantageously done in combination with the axial movement of the rod, with the unit being controlled by selectively ordering the drive means 32.

The openings 38 made on the stretching rod 22 are advantageously distributed axially and circumferentially over the rod and are shaped (for example, orientation of the axis of the opening in relation to the axial direction, dimensions) to direct the cooling air to predetermined zones of the container during the manufacturing mode.

An axial movement that is different from the stretching rod 22 consequently makes it possible to obtain, in cooling mode, a spraying of the cooling fluid from the mold into the entire molding cavity 16 (and not only located in the zones of the molding cavity 16 of the mold 18 corresponding to said zones of the container).

It is recalled that a movement of the particular stretching rod 22, characteristic of the cooling of the mold during the cooling mode, is simple to carry out when the drive means 32 associated with the stretching rod 22 consist of an actuator formed by at least one linear motor.

Advantageously, the axial driving and/or rotation of the stretching rod 22 is determined to carry out radially a complete flushing of the entire molding cavity 16.

For each cooled mold 18, the cooling fluid is introduced into a molding cavity 16 that forms a closed volume as can be seen in FIG. 3d or 3e, with the molding cavity 16 being formed as soon as the molding unit 12 is in the closed position.

In the closed position of the molding unit 12, the half-molds 24 and, if necessary, the mold bottom 28 are joined in a contiguous manner to form the molding cavity 16 of the container inside the mold 18.

As illustrated in FIGS. 3d and 3e in particular, in the cooling mode characterized by the absence of a preform, the opening 46 that is made in the upper face makes possible the axial passage of the stretching rod 22 inside the molding cavity 16 so that the cooling fluid of the mold 18 that is formed, here by the compressed air, is introduced therein.

Preferably, cooling fluid is also introduced into the molding cavity 16 by means of the means 44 for demolding the bottom to improve the cooling and more particularly that of the mold bottom 28.

The axial descent of the stretching rod 22 is accompanied by that of the blow-molding means 20 that will cover the upper face of the mold 18 of the molding unit 12 in the closed position.

The blow-molding means 20 make it possible to isolate the molding cavity 16 in relation to the outside. For this purpose, for example, the nozzle nose comprises sealing means that work in the lower position with the upper face of the mold 18.

The cooling fluid is introduced via the stretching rod 22 in a continuous manner, filling the molding cavity 16 and escaping from it through the opening 46.

Advantageously and as illustrated in FIG. 3f, during and after the step for cooling the mold 18, the cooling fluid—when it is formed by the compressed air—escapes through said opening 46 to be evacuated through an exhaust device (not shown) that the blow-molding means 20 comprise and that commonly comprises a sound suppressor.

Noise linked to the expansion of compressed air and then to its evacuation is thus limited.

Advantageously, the evacuation of the cooling air from the mold 18 through such a sound suppressor makes it possible to control the pressure inside the molding cavity 16, which makes it possible to raise the blow-molding means 20 to the upper position and then to open again the molding unit 12.

Preferably, the introduction of the cooling fluid during the cooling step is executed in all of the molds 18 of the molding units 12 (or only some of them) that are in the closed position and that are locked in the closed position by the locking means 40.

The locking of the molding unit 12 in the closed position makes it possible to limit the leaks of cooling fluid from the mold 18 toward the outside, quite particularly in the area of the joint plane between said half-molds 24.

When the molding unit 12 comprises compensation means 42, these compensation means 42 are preferably activated and pressurized also to contribute to the step for cooling the mold in the cooling mode.

The compensation means 42 will oppose the forces exerted by the pressurized cooling fluid introduced inside the molding cavity 16 and in so doing will prevent play from developing in the area of the joint plane.

The appearance of such play would actually be reflected by leaks of cooling fluid in the area of the joint plane and this although the molding unit 12 is locked in the closed position because with the locking being mechanical, operational play inevitably exists.

When the compensation means 42 are activated during the cooling step, the cooling fluid of the mold 18 is evacuated primarily by the sound suppressor of the blow-molding means 20.

Advantageously, the cooling air that is used for cooling the molds can be recovered to be reused.

Once the cooling fluid ceases to be introduced into the molding cavity 16 of the mold 18 of every other unit, even or odd, being in the closed position in the predetermined angular sector, the next step is then a return to the upper position of the blow-molding means 20 and the stretching rod 22 as is illustrated in FIG. 3f.

The compensation means 42 also cease to be active.

The molding unit 12 is then in the position shown in FIG. 3g, or a position analogous to the one initially occupied in FIG. 3b.

Preferably, each molding unit 12 comprises means for measuring (not shown) the temperature of the mold 18.

In the manufacturing mode, these measuring means, such as a temperature probe, are actually used for determining whether the mold 18 that is heated by the heating means 34 has reached and/or is at the temperature required for the manufacturing of containers.

Preferably, these same means for measuring the temperature of the mold are used in the cooling mode to determine whether the cooling of the mold is sufficient so that a maintenance operation can be carried out on the mold 18 in complete safety or whether a new cooling is to be performed.

As a variant, other means for measuring the temperature of the mold 18 can be used.

However, it will be appreciated there again that the use of temperature measuring means already equipping the molding unit 12 makes possible a simple and economical execution of the cooling method according to the invention since no modification of the molding machine 10 is necessary.

Advantageously, said cooling method comprises at least one step for measuring temperature to determine the temperature of the molds 18 that are being cooled or that are cooled.

Said mold cooling step is repeated until said measured temperature of the mold 18 is less than or equal to a predetermined target temperature Tc.

The target temperature Tc is, for example, a temperature of less than 50° C. so as to make possible the human intervention of at least one operator in complete safety, preferably without specific protective equipment, and this regardless of the purpose of the intervention.

Preferably, an alert is issued when a temperature approaching the given target temperature Tc is reached, for example on the order of 60° C. (degrees Celsius).

The cooling step may or may not be then continued, for example until it reaches a value of 20° C., depending in particular on whether the choice is made for the operator to intervene with or without specific protective equipment.

The intervention consists of, for example, a maintenance operation, such as a cleaning of the impression of the mold or else changing the mold.

When, after having been cooled by one or more cooling steps, the carousel 14 is again driven in rotation, the molding unit 120 is positioned at the exit S of the machine 10 where it is again in the open position as illustrated in FIG. 3h.

Of course, the opening of the unit 120 is preceded by unlocking locking means 40 that until then kept the unit in the closed position.

The procedure that was just described with reference to FIGS. 3a to 3h for cooling a mold 18, arbitrarily and, for example, that of the molding unit 120, is simultaneously carried out in the same manner in other molding units 12.

In the first example with the maximum cooling zone, the cooling step is preferably executed successively in the even and then the odd molding units 12.

The cooling step can be repeated one or more times in a given group, formed by, for example, even or odd molding units 12, and this until the target temperature Tc is reached.

By comparison in particular with the first example, a second example for executing the method for cooling heated molds will be described below.

In this second example, the cooling zone is said to be "optimal" and corresponds to an angular sector with an angle ($\beta_2$) that is shown with the angle ($\alpha$) in FIG. 1.

The optimal cooling zone corresponds to an angular sector that is centered on the axis O of rotation of the machine 10 and that has an angle ($\beta_2$) whose value is less than ($\beta_1$). It is recalled here that ($\beta_1$)=(360°−$\alpha$) and that the angle (α) corresponds to the angular sector in which said molding units 12 are in the open position.

By comparison, the optimal cooling zone is smaller than the maximum cooling zone in such a way that the number of molding units 12 that are found therein is smaller.

Preferably, the value of the angle ($\beta_2$) determining the angular sector that corresponds to said optimal cooling zone is selected in such a way that the molding units 12 that are found therein are not only in the closed position but also that these molding units 12 are locked in the closed position.

However, whether or not the locking means 40 are used is determined in particular based on the pressure of the cooling fluid. This also applies to whether or not the compensation means 42 are used.

Preferably, the compensation means 42 are used only in combination with the means 40 for locking the molding units 12 in the closed position.

When the pressure of the cooling fluid is, for example, on the order of 7 bar, the use of the locking means 40 makes it possible to limit the losses linked to leaks and also to prevent the whistling emitted during such leaks.

Preferably, the introduction of the cooling fluid depending on the cooling step is carried out simultaneously on all of the molding units 12 that are in said optimal cooling zone.

In the case of the second example, the cooling zone corresponds to an angular sector that is centered on the axis (O) of rotation of the machine (10) and that has an angle ($\beta_2$) whose value is, for example, less than or equal to 180°.

As illustrated in FIG. 1, for example, the execution of the cooling step is initiated in the molding units 12 that are in said optimal cooling zone, or the units 122, 123, 124 and 125.

The cooling step is carried out simultaneously in only some of the molding units 12, more specifically in half of the units according to the example that is shown in FIG. 1.

Once cooled to a temperature that is less than or equal to the target temperature Tc, a maintenance operation is then possible on the molds 18 of each of these molding units 12, in particular a cleaning operation or disassembly performed by at least one operator.

The maintenance operation can be begun immediately on those of the molds 18 that were cooled or after all of the molds 18 of the machine 10 were cooled.

Because the molding units 12 are stationary during the cooling step, it is possible for at least one operator to intervene on the cooled molds 18 of the molding units 12 that are, in the open position, in the angular sector of angle (x), whereas other molds 18 are still in the cooling phase.

Advantageously, all or part of the maintenance operation on the molds 18 is carried out in the background, in parallel to the execution of the cooling step in the cooling zone.

As described previously, once the cooling of the molds 18 of the molding units 12 that are in the optimal cooling zone is performed, the carousel 14 is driven in rotation by 180° in such a way as to position the other molding units 12, namely the units 126, 127, 120 and 121.

The carousel 14 is stopped to immobilize said molding units 126, 127, 120 and 121 in the optimal cooling zone, and the cooling step is again executed to cool the molds 18 of each of these units.

Advantageously, an operator can intervene on the cooled molds 18, in particular units 123 and 124 that occupy the open position after the rotation at 180° of the carousel 14 that makes it possible to carry out the cooling of the other half of the molds of the molding units 12.

The invention claimed is:

1. Method for cooling heated molds from a machine (10) for molding containers from thermoplastic material by stretch blow molding hot preforms by means of at least one pressurized fluid, with said rotary-type machine (10) comprising at least molding units (12), each comprising at least one mold and that are arranged on the periphery of a carousel (14) that can be driven in rotation around an axis (O) of rotation of the machine, with each molding unit (12) comprising at least a blow-molding device (20) integrating a stretching rod (22), a heating element (34) associated with the mold (18) of the unit for heating it, with said mold (18) comprising at least two half-molds (24) that each comprise an inner molding face (30) and that are respectively mounted on movable supports (26) around an axis (A) between at least one open position and one closed position of the unit, in which said inner faces (30) of said at least two attached half-molds (24) delimit together at least a portion of a cavity (16) for molding the container, wherein said cooling method comprises, for cooling said molds (18), introducing, selectively, at least one cooling fluid into a volume inside the molding cavity (16) of some of the molding units (12) when the selected molding units are in a closed position such that, after the carousel (14) is stopped to immobilize them at least during said cooling step, the molding units (12) are in a predetermined cooling zone, and wherein the cooling fluid is delivered at a lower pressure than a pressure of the pressurized fluid for blow molding.

2. Method according to claim 1, wherein the cooling zone corresponds to an angular sector that is centered on the axis (O) of rotation of the machine (10) and that has an angle ($\beta1$; $\beta2$) whose value is less than or equal to (360°−α) with an angle (α) that corresponds to the angular sector in which said molding units (12) are in the open position.

3. Method according to claim 1, wherein the cooling zone corresponds to an angular sector that is centered on the axis (O) of rotation of the machine (10) and that has an angle (~2) whose value is less than or equal to 180°.

4. Method according to claim 1, wherein the introduction of the cooling fluid during the cooling step is carried out in molding units (12) that are locked in the closed position by a lock (40) that comprises each of said molding units (12) of the machine (10).

5. Method according to claim 1, wherein the cooling fluid is introduced inside the molding cavity (16) by at least one stretching rod (22).

6. Method according to claim 5, wherein the stretching rod (22) is moved axially inside the molding cavity (16) during said cooling step to carry out an axial flushing of the molding cavity (16).

7. Method according to claim 5, wherein the stretching rod (22) is driven selectively in rotation to carry out a circular flushing of the molding cavity (16) by means of said cooling fluid.

8. Method according to claim 1, wherein at least a portion of cooling fluid is introduced inside the molding cavity (16) by the mold bottom (28) having a vent (44), said mold bottom (28) for demolding the bottom equipping the molding units (12) of said machine.

9. Method according to claim 1, wherein the cooling fluid is introduced intermittently during the cooling step according to at least one sequence that comprises at least one introduction of said fluid during a predetermined duration (d) followed by an interval (t) during which said introduction is interrupted.

10. Method according to claim 1, further comprising at least one step for measuring temperature for determining the temperature of the cooled molds (18) and wherein said cooling step is repeated in said molding units (12) until said temperature of the molds (18) is less than or equal to a predetermined target temperature (Tc).

11. Method according to claim 2, wherein the cooling zone corresponds to an angular sector that is centered on the axis (O) of rotation of the machine (10) and that has an angle ($\beta_2$) whose value is less than or equal to 180°.

12. Method according to claim 2, wherein the introduction of the cooling fluid during the cooling step is carried out in molding units (12) that are locked in the closed position by a lock (40) that comprises each of said molding units (12) of the machine (10).

13. Method according to claim 1, wherein the introduction of cooling fluid depending on the cooling step is carried out simultaneously on all of the molding units (12) that are in said cooling zone.

14. Method according to claim 1, wherein the introduction of cooling fluid depending on the cooling step is carried out simultaneously on only some of the molding units (12) that are in said cooling zone.

15. Method according to claim 13, wherein the cooling zone corresponds to an angular sector that is centered on the axis (O) of rotation of the machine (10) and that has an angle ($\beta 1$; $\beta 2$) whose value is less than or equal to (360°−$\alpha$) with an angle ($\alpha$) that corresponds to the angular sector in which said molding units (12) are in the open position.

16. Method according to claim 14, wherein the cooling zone corresponds to an angular sector that is centered on the axis (O) of rotation of the machine (10) and that has an angle ($\beta_1$; $\beta_2$) whose value is less than or equal to (360°−$\alpha$) with an angle ($\alpha$) that corresponds to the angular sector in which said molding units (12) are in the open position.

17. Method according to claim 13, wherein the cooling zone corresponds to an angular sector that is centered on the axis (O) of rotation of the machine (10) and that has an angle ($\beta_2$) whose value is less than or equal to 180°.

18. Method according to claim 14, wherein the cooling zone corresponds to an angular sector that is centered on the axis (O) of rotation of the machine (10) and that has an angle ($\beta_2$) whose value is less than or equal to 180°.

19. Method according to claim 13, wherein the introduction of the cooling fluid during the cooling step is carried out in molding units (12) that are locked in the closed position by a lock (40) that comprises each of said molding units (12) of the machine (10).

20. Method according to claim 14, wherein the introduction of the cooling fluid during the cooling step is carried out in molding units (12) that are locked in the closed position by a lock (40) that comprises each of said molding units (12) of the machine (10).

* * * * *